United States Patent [19]

Van Doorn et al.

[11] 3,831,481

[45] Aug. 27, 1974

[54] CUTTER REELS FOR FIBER CUTTING APPARATUS

[75] Inventors: Donald W. Van Doorn; James B. Hawkins; Roy T. Williams, all of Columbus, Ga.

[73] Assignee: Lummus Industries, Inc., Columbus, Ga.

[22] Filed: June 14, 1971

[21] Appl. No.: 152,758

[52] U.S. Cl.............. 83/674, 83/698, 83/913, 83/926 G
[51] Int. Cl............................................. B26d 1/12
[58] Field of Search. 83/913, 926 G, 674, 698, 343, 83/346

[56] References Cited
UNITED STATES PATENTS

| | | | |
|---|---|---|---|
| 3,485,120 | 12/1969 | Keith | 83/913 X |
| 3,508,461 | 4/1970 | Stream | 83/913 X |
| 877,010 | 1/1908 | Spalckhaver | 83/698 X |
| 3,644,109 | 2/1972 | Klink et al. | 83/913 X |
| 2,745,491 | 5/1956 | Sonneborn et al. | 83/346 X |

Primary Examiner—Andrew R. Juhasz
Assistant Examiner—James F. Coan
Attorney, Agent, or Firm—Jennings, Carter & Thompson

[57] ABSTRACT

A cutter reel for tow cutting apparatus especially for use in apparatus as shown, described and claimed in U.S. Pat. No. 3,485,120. The construction provides reels which compared to prior art reels are more self cleaning, in which the blades may be more safely installed and removed, in which shorter and narrower blades may be used without decreasing the effective cutting lengths thereof or the strength of the same, and in which it is impossible to install the blades backwards. Further, the new reel causes the blades to be positioned correctly, in positive manner, when the reel parts are assembled and the construction decreases the damage to the reel parts and the blades by greatly decreasing the cahnce of the cutting edges of the blades contacting the reel parts when changing blades.

13 Claims, 11 Drawing Figures

PATENTED AUG 27 1974
3,831,481
SHEET 1 OF 4
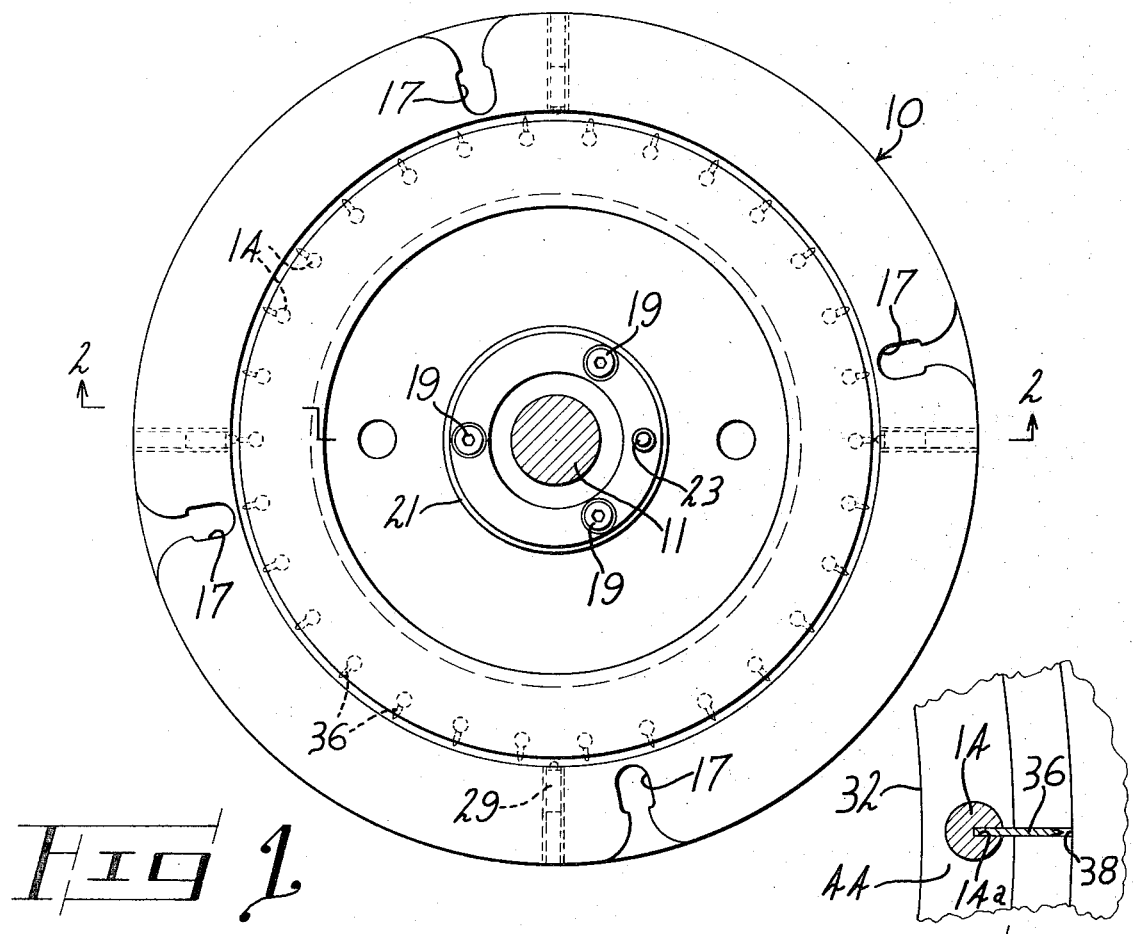
Fig 1
Fig 5
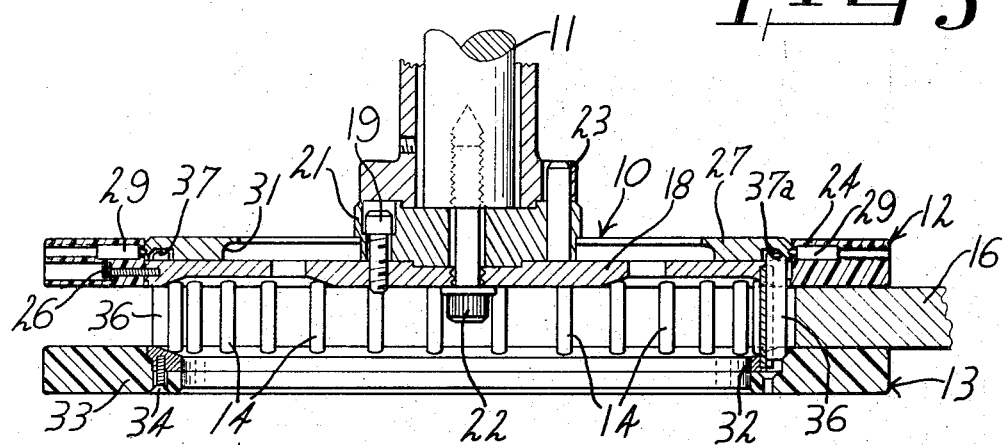
Fig 2
INVENTORS.
Donald W. Van Doorn
James B. Hawkins
Roy T. Williams
BY
Jennings Carter & Thompson
Attorneys PATENTED AUG 27 1974 3,831,481
SHEET 3 OF 4
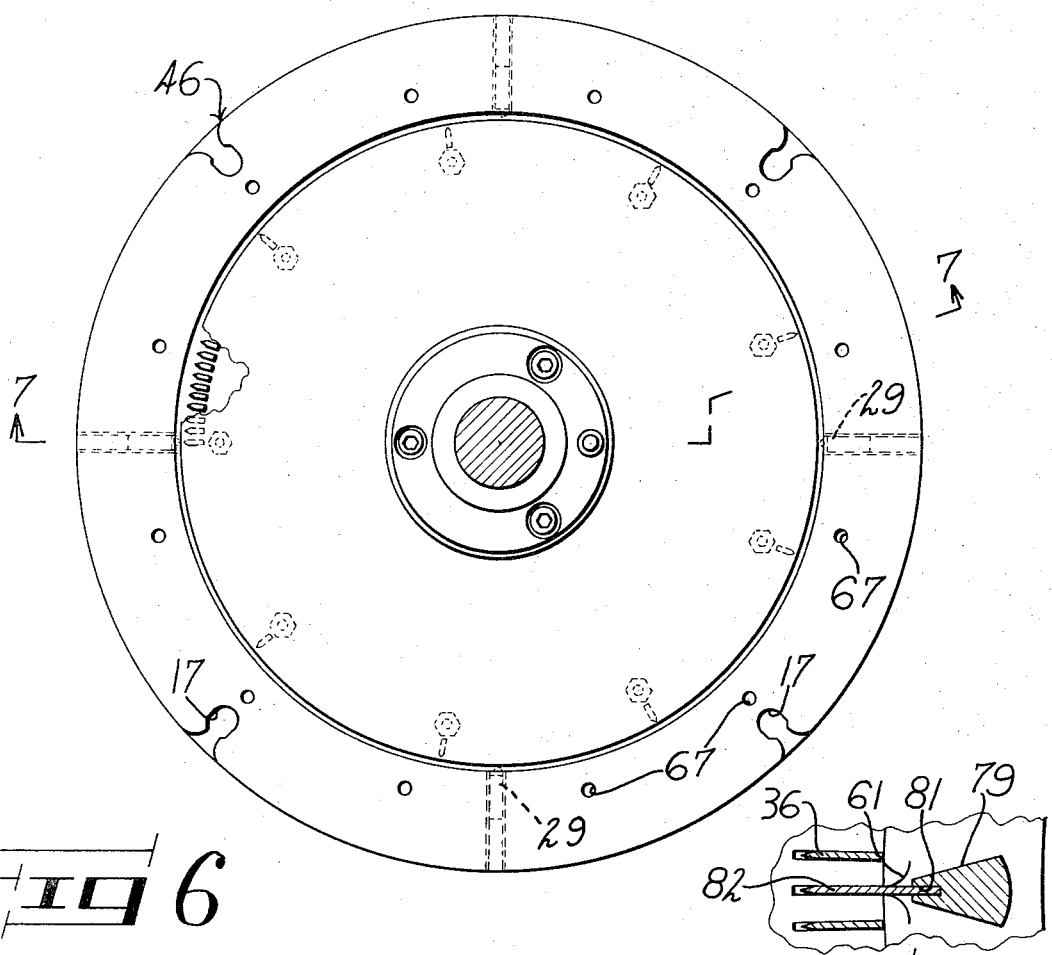
Fig 6
Fig 11
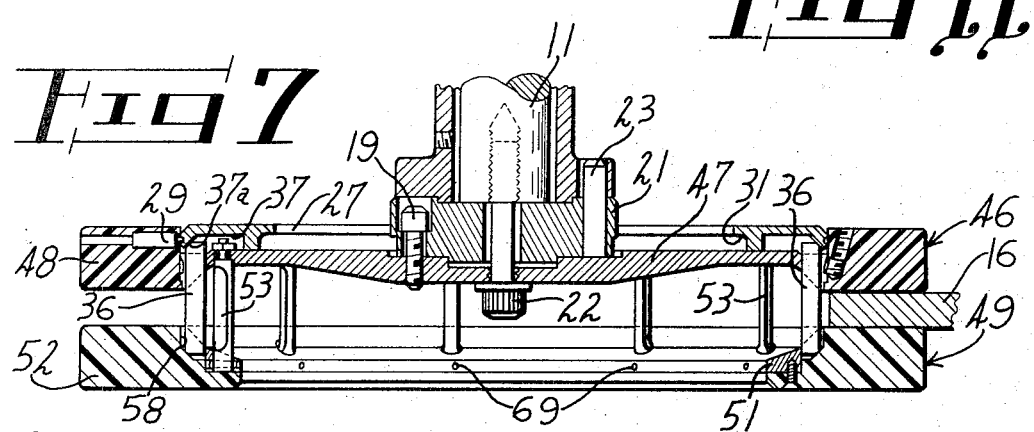
Fig 7
Fig 10
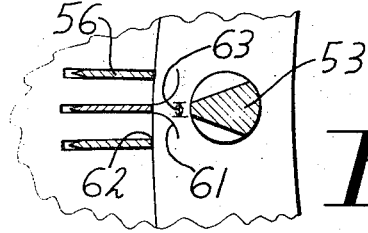
INVENTORS.
Donald W. Van Doorn
James B. Hawkins
Roy T. Williams
BY
Jennings, Carter & Thompson
Attorneys

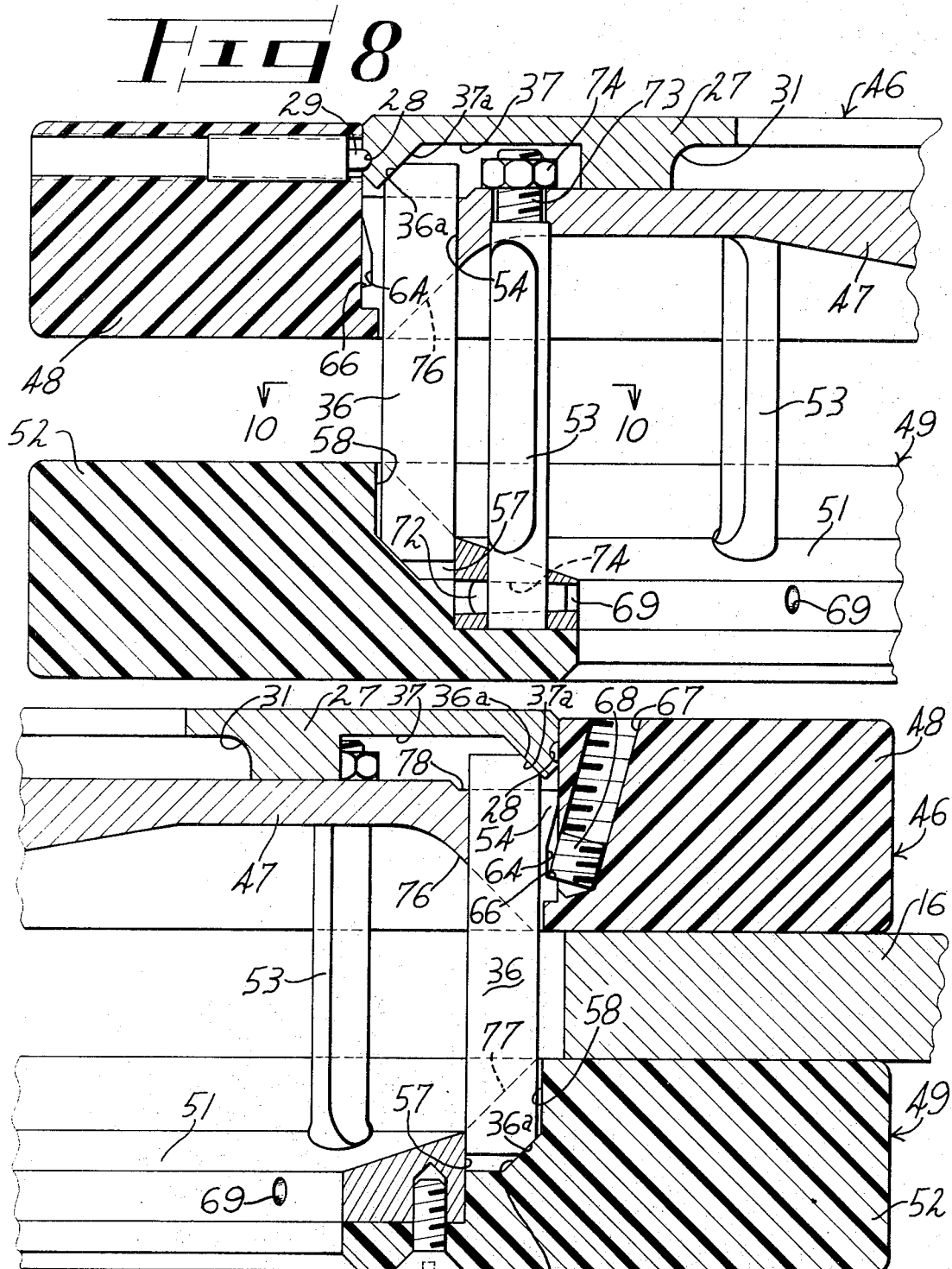

3,831,481

CUTTER REELS FOR FIBER CUTTING APPARATUS

Our invention relates to cutter reels for fiber cutting apparatus and particularly to such reels which may be incorporated in apparatus shown, described and claimed in U.S. Pat. No. 3,485,120.

In the art to which our invention relates the cutting of continuous fiber filaments or tow into spinable lengths involves, in accordance with the above patent, the use of a rotating blade carrying reel. The reel carries a plurality of razor sharp, blade-like cutters with their cutting edges facing outwardly of the reel and spaced apart substantially equal to the fiber length desired. A continuous strand of fiber is wrapped around the periphery of the reel and a pressure roller engages the outer surface of the wrapped strand, forcing its inner surface into cutting contact with the blades as the reel rotates, thus cutting the strand or tow into short lengths. The cut fiber must then pass inwardly of the reel, between the blades and this inward movement is a result of subsequent cutting of additional fibers. Between adjacent blades, therefore, during the cutting operation, there exist columns of fibers which must be forced or pushed inwardly for discharge by the oncoming or newly cut fibers for removal from the apparatus.

Heretofore, such cutting reels have been subject to many objections both with regard to their construction as well as their operation. By way of example, prior reels and blades for use therein have been so constructed as to present an extreme hazard to the operator when changing blades. That is to say, the reels and blades heretofore made have been so constructed as to require the operator to grasp the ends of the blades for removal or insertion in the areas of the extremely sharp cutting edges, oftentimes resulting in cutting the fingers. The construction of prior blades and reels also has been such that the blades can inadvertently be installed backwards, that is, with the cutting edges reversed. Also, prior reels are prone to become clogged with cut fiber requiring that the apparatus be stopped and manually cleaned or unclogged. In prior reels, the configuration and construction of the slots for engaging the blades results in great difficulty in cleaning accumulated fiber when changing from one color to another resulting in contamination of the newly cut fibers. Also, in prior reels of this general type the blades have not been as adequately supported both against cutting pressure and bending as desirable, resulting in inaccurate fiber cutting and damage to the blades due to lateral bending or flexing during the cutting operation.

In view of the foregoing we propose and herein disclose and claim a cutting reel and blade construction for fiber cutting apparatus which eliminates or materially reduces the shortcomings of prior reels mentioned above. Specifically, our invention has for its objects the provision of a cutter reel of the character described having the following characteristics, generally stated:

1. Safety in installing and removing the blades or cutters, this being accomplished by the particular construction of the reel parts which hold the blades adjacent their ends as well as a particular construction of the blades themselves.

2. A reel which is self cleaning, namely, in which the tendency of fibers to collect in and around the blade slots and other parts is greatly reduced, almost to the point of elimination, permitting the removal and insertion of blades with a minimum of cleaning in the process and reducing contamination of subsequently cut fibers by those previously cut.

3. A reel in which, by simply inserting the blades and assembling the reel parts, insures that each blade is positively and correctly positioned relative to the reel parts themselves and to each other.

4. A reel in which the parts thereof are less likely to be cut or damaged during removal and replacement of the blades, this feature also lessening the likelihood of dulling new blades upon their insertion into the apparatus.

5. A reel so constructed that blades narrower and shorter than heretofore may be used without decreasing the length of the cutting edges and without increasing the likelihood of the blades bending or flexing when in use.

6. A reel and blades for use therein so constructed that the reel parts cannot be assembled if a blade is installed backwards, that is with its cutting edge facing inwardly of the reel rather than outwardly.

Our invention also contemplates a reel of the character designated in which the frame parts thereof are held axially spaced by post-like members, these being definitely located relative to the blades so that a large number of blades may be installed for cutting fiber into short lengths, without clogging the apparatus. Our invention also contemplates a cutter or blade for fiber cutting reels which are especially shaped on their ends and along portions of their cutting edges to provide blades compatible with my improved reel, thus to afford several of the advantages and improvements listed above.

Apparatus illustrating features of our invention is shown in the accompanying drawing forming a part of this application in which:

FIG. 1 is a plan view, partly broken away and in section, of a reel for cutting fibers of relatively long lengths;

FIG. 2 is a detail sectional view taken generally along line 2—2 of FIG. 1;

FIG. 5 is a detail fragmental view taken generally along line 513 5 of FIG. 4;

FIG. 6 is a view corresponding generally to FIG. 1 and showing a reel especially adapted for cutting fibers into relatively short lengths;

FIG. 7 is a detail sectional view taken generally along line 7—7 of FIG. 6;

FIGS. 8 and 9 are enlarged detail fragmental views taken of peripheral portions of the reel shown in FIG. 7;

FIG. 10 is an enlarged detail fragmental view taken generally along line 10—10 of FIG. 8; and, FIG. 11 is a detail fragmental view corresponding to FIG. 10 and showing a slightly modified form of my invention.

Figure 3:
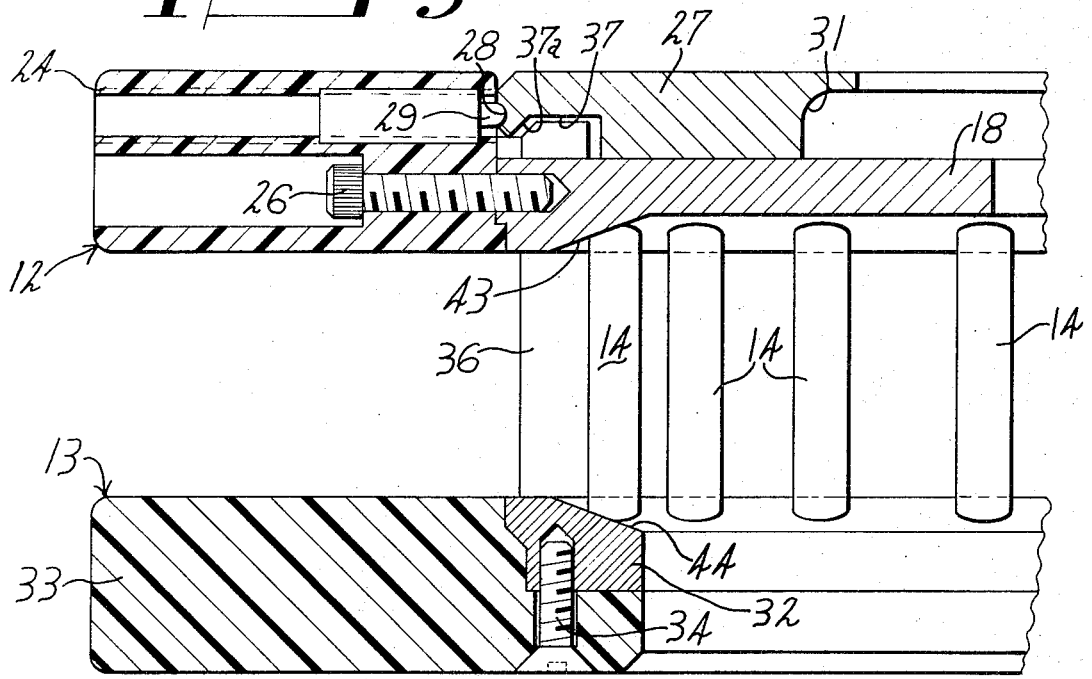
FIGS. 3 and 4 are enlarged detail fragmental views of peripheral portions of the reel shown in FIG. 2.

Referring now to the drawings for a better understanding of our invention and particularly to FIGS. 1 to 5 inclusive, it will be seen that the reel indicated generally by the numeral 10 is adapted for mounting on a shaft 11 which is driven from apparatus, not shown, so that the entire reel rotates.

The reel comprises generally a pair of spaced frame members 12 and 13, each of which will be described more in detail later. These memgers as complete subassemblies are held in axially-spaced relation relative to each other by means of a plurality of post-like connector and spacing members indicated at 14. Also, in accordance with the teachings of the above indentified patent, between the spaced peripheral portions of the members 12 and 13, at one location about the same, the periphery of a pressure roller 16 is positioned with its periphery at a fixed distance from the cutters or blades of the device which will presently be described. The fiber to be cut is wound about the periphery of the reel 10, and in practice the upper frame member 12 is provided with openings 17 to receive a knot in the end of the rope or length of tow, for initially starting the device. In view of the fact that the cutting operation per se is described and dealth with at length in said patent, the description herein will be confined to the physical construction of the reel itself, which consitiutes my improvement.

The upper frame member 12 is formed essentially of three disc like portions. First, there is a disc like central portion 18 which may be of metal and which is adapted to be secured by a plurality of studs 19 to a central hub 21, in turn carried by the shaft 11 by means of an upwardly extending screw 22. A centering pin 23 may be provided in the upper surface of the member 18 to aid in assemblying the entire reel onto the hub 21.

Next, the outer periphery of the frame member 12 may consist essentially of an annulus of material indicated at 24 and which may be formed of synthetic material such as "MICARTA." The "MICARTA" ring is held to the periphery of the frame member 18 by means of a plurality of radially directed studs 26. Finally, the frame member 12 is completed by the provision of a snap-in blade holding annular portion 27. The portin 27 may be provided with an annular groove 28 extending completely about its periphery. By the provision of spring pressed detents 29, set into the periphery of the annular outer portion 24, the ring portion 27 is spring snapped into position, for ready removal. Also, adjacent its center the ring 27 may be provided with an annular undercut section 31, thus affording a finger grip for engaging the ring 27 to pull it upwardly, when changing blades as presently will appear.

The bottom frame member 13 comprises essentially two parts. First, there is an annulus or ring-like member 32 which may be of metal and another "MICARTA" annulus 33. The rings 32 and 33 are secured together at intervals by means of flat headed screws 34.

It will be noted that the blades 36 are adapted to be mounted immediately radially outwardly of each of the connector members 14. To this end the members 14 are vertically slit as at 14a, to accommodate the rear or non-cutting edges of the blades.

Further, it will be seen that adjacent the underside of the periphery of member 27 there is a groove 37 into which the upper ends of the blades project. The peripheral portion of the groove 37 is provided with a downwardly and outwardly sloping annular section 37a and this engages, in complementarily fashion, a sloping section 36a on the end of the blade 36.

Somewhat in similar manner, the lower ends of the blades fit in an annular groove 38 cut into the upper surface of the member 13. This groove 38 has an outwardly and upwardly sloping portion 38a, against which the lower end 36a of the blades fit, in complementarily manner.

It will thus be seen that each of the blades is individually held by passing through slits 41 cut into the periphery of the upper member 27 and similar slits 42 cut into the periphery of the lower member 32, as well as being supported by the vertical slits 14a of the connector members 14.

Furthermore, it will be seen that with the blades in position in the several slots and with the member 27 snapped into position the blades are forced inwardly with their non-cutting edges into contact with the bottoms of the slits 14a and the connecting members 14. This is due to the provision of the sloping portions 37a and 38a, in cooperation with the sloping end sections 36a of the blades. Therefore, merely by dropping the blades downwardly into their slots and then inserting the member 27 in place and snapping in the detents 29, the blades are held in place, firmly, and accurately.

It is to be particularly noted that due to the sloping walls 37a and 38a, in combination with the portions 36a on the ends of the blades, it is impossible to assemble the member 27 if even one of the blades is turned with its cutting edge inwardly instead of outwardly. This is for the reason that such blade would be too high to permit the detents to snap into the peripheral groove 28, thus warning the operator that one of the blades is incorrectly installed.

It will further be seen that by grasping under the undercut section 31 of member 27 it may be lifted bodily upwardly, to remove it. When this is done the blade upper ends are presented at a level above all the remaining mechanism, namely, at a level above the top of the member 18. The operator may therefore work from the center of the disc, and grasp the blades by their unsharpened, rear edges for removal. In like manner insertion of new blades may be accomplished in this same fashion, thus eliminating the likelihood of cutting the fingers on the sharp edges. Even if grasped directly from their upper ends the fact that the cut sections 36a are not sharp, at least until at the very point of the front edge, the blades may even be pulled vertically upwardly, by grasping them between the fingers at their very ends, without damage to the fingers.

There is ample clearance between the parts of the members 12 and 13 adjacent the front or cutting edges of the blades and this prevents damage to those parts and to the blades when removing and inserting them.

Figure 4:
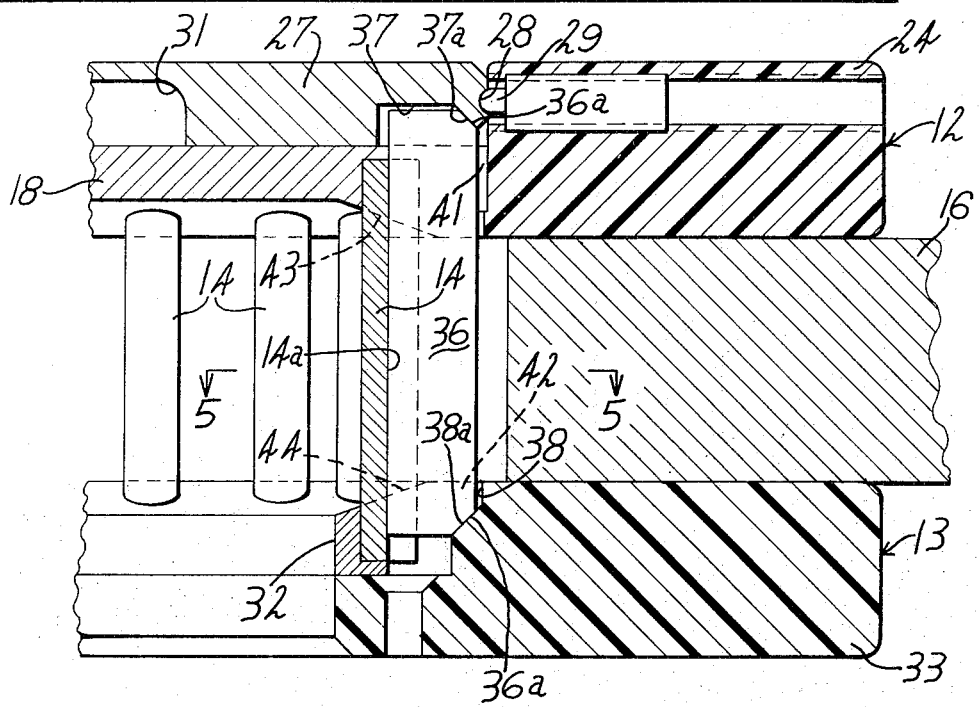

It will also be noted as particularly shown in FIGS. 3 and 4 that the undersurface of the member 18, adjacent its periphery, is upwardly and inwardly relieved as indicated at 43. Similarly, the upper surface of the member 32, adjacent its periphery is downwardly relieved as indicated at 44. This relief gives adequate room for the column of material between the blades continually to be pushed by oncoming material inwardly of the reel, where it drops downwardly of the same as shown in the several figures, for discharge from the casing of the apparatus.

Turning now to a particular description of FIGS. 6 through 10, we illustrate in those figures a reel which emodies many of the features of the one already dscribed, but which has specific features permitting the use of a large number of blades for cutting relatively short lengths of tow or other continuous filament material. Thus, the reel in question embodies the upper frame member 46 having a metal portion 47 and the "MICARTA" outer ring 48. The snap ring 27, using the detents 29, is employed. In similar manner the lower frame member 49 comprises the inner annular member 51 and the outer "MICARTA" member 52.

As best shown in the large views, FIGS. 8 and 9, the connecting post-like members 53 are secured in suitable manner to the portions 47 and 51 to hold the frame members 46 and 49 in axially spaced relation relative to each other.

In this instance the periphery of the upper member 47 is slit as at 54 to provide one slit for each blade 36 to be used. In similar manner, the periphery of the lower metal member 51 is slit to provide aligned slots to receive the lower ends of the blades, these slits being indicated at 57. In the case of the slits 54 and 57 it will be seen that the blades bear directly against the bottoms or inner end walls of these slits.

In quite similar manner to that already described the under surface of the member 27, having its downwardly and outwardly sloping annular surface 37a contacts the beveled portions 36a of the blades, to force them into the slits. The upper surface of the lower "MICARTA" member 49 is annularly grooved as at 58 to provide an upwardly and outwardly sloping wall section 59 which contacts the lower beveled edges 36a of the blades, thus to force that end of the blade into the bottom or inner end walls of the slits 57.

The connecting members 53 are generally triangular in shape in the areas thereof which span the space between the members 48 and 49. The points of the wedge shaped cross sections are outwardly directed as best shown in FIG. 10. Furthermore, in order to permit proper escape of the material inwardly we locate the posts 53 directly behind a selected one of the blades 36, but no closer to the blade, or any blade, than the radius of an arc indicated at 61. The arc 61 is struck from the corner 62 of the blade immediately adjacent the one behind which the post 53 is located and its radius is equal the distance from the point 62 to the nearest point on the blade behind which the post is located. Still further, the point of the post 53, in its triangular shaped area, should be no more than one-eighth inch across, that is, no more than one-eighth inch in the dimension indicated at 63. The distance from the nose of the post 53 to the nearest blade should be more than one-eighth inch and no greater than one and one-half inches. We have found these distances to be rather critical when cutting certain kinds of material and any substantial variance therefrom makes it difficult for the material to move inwardly of the reel for discharge.

Several other details concerning the construction of the figures being described should be noted. While various means for holding the top "MICARTA" ring 48 to the member 47 may be devised, we prefer to provide the outer periphery of the member 47 with a groove 64 having a shoulder 66 thereon. We then drill and tap holes 67 into the "MICARTA" member 48, at intervals around the same and run screws 68 which contact the shoulder 66, thus securing the parts 47 and 48 together.

It will also be seen that the posts or connectors 53 may be secured at their lower ends to the member 51 by drilling peripherally, inwardly directed holes 69 in the member 51. The posts at their lower ends may be provided with holes 71 and tapered wedge pins 72 may be driven in, thus to secure the posts to the member 51. At their upper ends the posts may be reduced and threaded as indicated at 73 to receive nuts 74 which secure the upper ends thereof to member 47.

Similar to the first described modification it will be seen that the under surface of member 47 is undercut at 76. The top surface of the member 51, adjacent its periphery is also undercut at 77 thus to provide an ever-increasing space, inwardly of the reel more readily to permit inward flow and eventual discharge of material being cut. We preferably so undercut the parts 47 and 51 as indicated at 76 and 77 so as to include an angle of 90° between the surfaces 76 and 77, but in no event less than 45°, included angle.

Reviewing a description of FIGS. 6 to 10, it will be seen that the blades may be installed and removed without undue hazard to the operator by first removing the plat or hold down ring 27. The blades now are presented for easy grasping by the fingers, and this is facilitated by a reduction in the depth of the upper member 47, in annular fashion, as indicated at 78. With the ring or hold down member 27 snapped in place the sloping surfaces of its under periphery engage the sloping frontedge portions 36a of the blades and push them into the bottom of the slits 54. In similar manner the sloping annular groove section 59 of the lower member 49 engages the sections 36a of the blades and forces them inwardly into the bottoms of the slits 57 of the lower member 51.

In FIG. 11 we show a slightly modified form of post and blade arrangement. In this instance, the triangular shaped posts 79 are provided with vertical slits 81 to receive specially formed blades 82. That is to say, we use the blades 36 except immediately in front of each post, and the blades 82 in front of the posts are simply wider so that their rear edges fit in the slots 81. The advantage of this is that the blades 82 act as sort of guides or directors for the material moving radially inwardly between the blade 82 and the blades on each side thereof. However, and again, the nose of the wedge shaped post 79 is set so as never to lie within the arc having the radius 61 as already explained.

In view of the foregoing it will be seen that we have devised an improved reel for use in tow cutting apparatus. A consideration of the detail description will readily show that we have attained the objects set forth at the beginning of this specification, that our improved reels permit safe and expeditious removal and insertion of blades when necessary. Furthermore, with the type reel employing a large number of blades for cutting short fibers, by the provision of the supporting connecting members located, shaped and positioned as indicated, we assure that the material being cut is adequately discharged inwardly of the reel. We have found that the satisfactory operation of these reels in cutting most materials depends upon maintaining an extremely close relationship of the parts as herein defined with respect to the posts and blades, especially in connection with the reel using a large number of blades. If the posts are set too closely to the blades choking occurs. If the posts are too wide at their noses choking occurs, and hence the entire operation of the machine is adversely affected.

In connection with the slits in the members 18-32 and 47-51 for receiving the blades, it will be seen that in addition to providing the relief to let the material flow inwardly, the deepened edges of these members which terminate near the lower surface of the upper members and the upper surface of the lower members, afford extra strength to the blades against bending or flexing. This is, the blades are supported, sidewise, except substantially only in the space between the frame members, and this is true in both modifications. If the blades are unsupported through substantially the entire length, against sidewise movement, they will in fact bend, flex, and perhaps even twist, thus resulting in uneven length fiber and damage to the blades. Also, while we have referred to the reel as being mounted for rotation on a vertical axis, in some cases they may be mounted on a horizontal axis, or even an inclined axis.

In view of all the foregoing it will be seen that we have devised an improved, effective and efficient reel for fiber cutting apparatus. In practice our invention has proven to be extremely satisfactory and represents a considerable improvement over any prior art cutter reels.

While we have shown my invention in but two forms, it will be obvious to those skilled in the art that it is not so limited, but is susceptible of various other changes and modifications without departing from the spirit thereof.

what we claim is:

1. In a cutter reel for fiber cutting apparatus,
   a. a pair of generally circular frame members,
   b. connectors extending between the frame members and holding them in axially spaced relation,
   c. circular rows of radially directed slots in the members disposed to receive blade-like cutters which span the space between said members,
   d. each of said cutters having at lease one beveled section connecting one end and the cutting edge thereof,
   e. the bottoms of the slots in at least one said circular members being beveled complementarily with the beveled ends of the cutters fitting therein, whereby the cutters can be put in place only with the cutting edges facing in proper direction, and
   f. the portion of the one of said members containing said complementarily beveled section being removable relative to the remainder of said frame member, whereby with said portion removed the blades may be withdrawn from or inserted into their slots by moving them axially relative to the reel.

2. In a cutter reel for fiber cutting apparatus,
   a. a pair of generally circular frame members,
   b. connectors extending between the frame members and holding them in axially spaced relation,
   c. axially aligned circular rows of radially directed slots in the members disposed to receive blade-like cutters which span the space between said members, d. a removable blade holddown member carried by one of the frame members and having a groove in its surface on the blade side thereof having a beveledsection disposed to contact a beveled section on the ends of the blades thereby to force the blades inwardly of the reel into seating engagement with a part of the reel structure,
   e. the other frame member being provided with beveled surfaces for engaging beveled surfaces on the opposite ends of the blades, also effective to force the blades inwardly of the reel and into said seating engagement, and
   f. the surfaces of the frame members immediately inward of the blades being under cut or relieved, thereby to provide a space between the frame members which increases in volume, facilitating inward movement of the cut material for discharge from the reel.

3. Apparatus as defined in claim 2 in which the blades are long enough to project above the level of the immediately adjacent parts of the frame member carrying the removable blade holddown member, whereby upon removal of the latter the blades may be grasped by their ends between the thumb and forefinger for removal from the slots.

4. Apparatus as defined in claim 2 in which the removable blade holddown members are removably snap-locked into blade holding position.

5. Apparatus as defined in claim 2 in which there is one of said connectors for each blade, said connectors having longitudinal slots which are aligned with the slots in the frame members into which the rear or non-cutting edges of the associated blade fits.

6. In a cutter reel for fiber cutting apparatus,
   a. a pair of axially spaced reel members,
   b. means mounting a plurality of radially directed blade-like cutters adjacent the peripheries of said members and spanning the space between said members,
   c. a plurality of post-like members spanning said axial space and holding reel members in fixed relationship,
   d. said post-like members being located in radial alignment with selected ones of said cutters, the outermost surfaces of said post-like members lying outside of arcs struck on radii, the lengths of which are equal to the distance between said selected cutters and the cutters immediately adjacent thereto at the inner edges thereof, the center of said arcs being located on the closest points of said immediately adjacent cutters.

7. Apparatus as defined in claim 6 in which said post-like members are wedge shaped as viewed in transverse cross section with the points thereof outwardly directed relative to the center of the reel.

8. Apparatus as defined in claim 6 in which the nearest point on the post-like members to any cutter is more than one-eighth of an inch.

9. Apparatus as defined in claim 6 in which the closest point on the post-like members to any cutter is less than one and one-half inch.

10. Apparatus as defined in claim 6 in which the facing surfaces of said reel members immediately inwardly of the cutting edges of said cutters diverge, thereby to provide additional clearance for the inward movement of material cut by the cutters.

11. Apparatus as defined in claim 10 in which the angle included between said divergent surfaces is at least 45°.

12. Apparatus as defined in claim 7 in which the sides defining the leading edges of said wedge shaped post-like members terminate less than one-eighth inch apart at the leading edges thereof.

13. Apparatus as defined in claim 7 in which the included angle between the sides of the wedge shaped connectors include an angle of less than 45°.

* * * * *